Patented May 15, 1945

2,376,283

UNITED STATES PATENT OFFICE 2,376,283

DYESTUFFS SUITABLE FOR USE AS INDICATORS

Wallace Frank Short and Peter Oxley, Nottingham, England, assignors to Boots Pure Drug Company Limited, Nottingham, England, a company of Great Britain No Drawing. Application April 6, 1943, Serial No. 482,068. In Great Britain April 3, 1942

5 Claims. (Cl. 260—244)

This invention is concerned with the production of resazurin, a colouring matter which has uses as an indicator.

This substance may be made by the method described by Nietzki (Berichte, 1891, 24, 3368) which consists in oxidising a mixture of equimolecular proportions of resorcinol and nitrosoresorcinol in solution in alcohol with manganese dioxide and sulphuric acid.

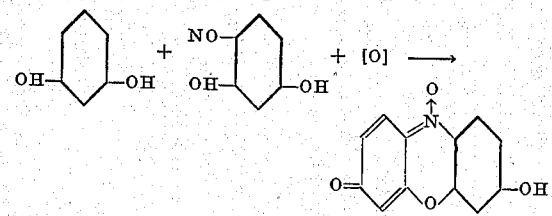

However, the yield of pure resazurin from the process is very variable owing to the production of resorufin by loss of oxygen from the resazurin.

The object of the present invention is to provide a method for the preparation of resazurin which gives a good yield in as short a time as possible and without any operating difficulties.

It has been found that the progress of the reaction employed by Nietzki depends upon the solvent employed. Thus, the reaction will not proceed at an appreciable rate if either water or acetic acid is used as the solvent instead of alcohol.

According to the present invention, the reaction between resorcinol and nitroso-resorcinol or a salt of nitroso-resorcinol and the oxidising agent is carried out in the presence of acetone or methyl ethyl ketone to aid solubility. Thus, with acetone or aqueous acetone, consistent yields of the order of 30 per cent of pure resazurin may be readily obtained. One factor contributing to the success of these solvents and methyl ethyl ketone are undoubtedly the fact that acetone is less readily oxidised by resazuring than is alcohol but some other factor must come into the question because, as mentioned above, the reaction does not proceed satisfactorily in either water or acetic acid.

The invention is not limited to the use of acetone since, as already stated, methyl ethyl ketone may be used instead.

In order that the invention may be clearly understood and readily carried into effect, the novel process will now be described by way of the following detailed examples:

Example 1

55 gms. of resorcinol together with 88.5 gms. of a good quality of potassium salt of 4-nitrosoresorcinol are dissolved in 200 cc. of water and 800 cc. of acetone added with stirring. The product is cooled in a freezing mixture and a mixture of 67.5 cc. of concentrated sulphuric acid B. P. and 67.5 cc. of water is added drop by drop at or below 0° C. A thick light yellow curd is formed from the reaction mixture and requires very vigorous stirring at this stage.

Then 55 gms. of precipitated manganese dioxide is added gradually at such a rate that the temperature does not exceed 15° C.; it is found that this addition occupies about 20 minutes. After a few grams of the manganese dioxide is added, the reaction mixture liquefies and the vigour of stirring is adjusted to maintain a permanent foam. Stirring is continued for 3 hours at 15° C. and the product then poured into 5 litres of warm water at about 45° C. The dark brown precipitate is coagulated by standing for 15 minutes and is then filtered and washed with about 3 litres of water until the washings are practically free from sulphate. The solid is then stirred mechanically for 1 hour at room temperature with a solution of 275 gms. of crystalline sodium carbonate in 1 litre of water. The crystalline precipitate consists of fairly pure sodium resazurate and is then filtered and freed from adherent mother liquor by washing with a little saturated sodium carbonate solution.

Example 2

50 gms. of resorcinol and 63 gms. of 4-nitrosoresorcinol are dissolved in 700 cc. of acetone to which 200 cc. of water are added. 50 gms. of a sample of manganese dioxide containing 85 per cent $MnO_2$ is suspended in the solution by vigorous mechanical stirring and the suspension is cooled to 15° C. 90 gms. of concentrated sulphuric acid is added over a period of 5 minutes and the reaction mixture is stirred for a further 30 minutes while kept at 15° C. At the end of this time, the solution is filtered and the resazurin precipitated by the addition of water. It is treated as set out in Example 1, for conversion into sodium resazurate.

*Example 3*

50 gms. of resorcinol and 63 gms. of 4-nitrosoresorcinol are dissolved in 800 cc. of methyl ethyl ketone to which 200 cc. of water are added. 90 gms. of concentrated sulphuric acid are mixed with 100 cc. of water and the mixture added drop by drop with stirring at or below 0° C. Then 50 gms. of precipitated manganese dioxide are added slowly and the mixture stirred for 60 minutes while the temperature is not allowed to rise above 15° C. The product is worked up as described in Example 1.

The product from any of the above examples, after conversion into the sodium salt, may conveniently be finally purified by the action of sodium carbonate and recrystallisation of the sodium salt in the presence of an excess of sodium carbonate as described by Nietzki (Ber., 1889, 22, at page 3022). In either case, the yield of the pure sodium salt of resazurin amounts to above 30 per cent of the theoretical.

We claim:

1. A method for the production of a resazurin preparation which comprises the step of oxidising a mixture of resorcinol and nitrosoresorcinol with manganese dioxide and sulphuric acid in the presence of a solvent from the group consisting of acetone and methyl ethyl ketone.

2. A method for the production of resazurin which comprises oxidising a mixture of resorcinol and nitrosoresorcinol with manganese dioxide and sulphuric acid in the presence of a solvent from the group consisting of acetone and methyl ethyl ketone.

3. A method for the production of resazurin which comprises adding sulphuric acid to a mixture of resorcinol and nitrosoresorcinol with a solvent from the group consisting of acetone and methyl ethyl ketone and then adding manganese dioxide gradually to the resultant mixture.

4. A method for the production of resazurin which comprises adding sulphuric acid to a mixture of resorcinol and nitrosoresorcinol with acetone and then adding manganese dioxide gradually to the resultant mixture.

5. A method for the production of an alkali metal resazurate which comprises oxidising a mixture of resorcinol and nitrosoresorcinol with manganese dioxide and sulphuric acid in the presence of a solvent from the group consisting of acetone and methyl ethyl ketone, precipitating the product in warm water and stirring the precipitated solid with a solution of an alkali metal salt.

WALLACE FRANK SHORT.
PETER OXLEY.